United States Patent

Hargest

[11] Patent Number: 5,277,797
[45] Date of Patent: Jan. 11, 1994

[54] OIL AND WATER SEPARATOR FOR THE BILGE OF A BOAT

[76] Inventor: Thomas S. Hargest, P.O. Box 21118, Charleston, S.C. 29413

[21] Appl. No.: 872,034

[22] Filed: Apr. 22, 1992

[51] Int. Cl.$^5$ .................... B01D 17/12; B01D 17/025
[52] U.S. Cl. .................... 210/86; 210/96.1; 210/109; 210/138; 210/257.1; 210/258; 210/104; 307/118; 340/620; 417/36
[58] Field of Search .................... 210/86, 94, 96.1, 104, 210/109, 110, 138, 248, 258, 257.1, 259, 513, 519, 533, 537, 540; 417/36; 307/118; 340/620; 73/304 R, 304 C

[56] References Cited

U.S. PATENT DOCUMENTS

| | | | |
|---|---|---|---|
| 1,494,906 | 5/1924 | Haynes | 210/127 |
| 2,428,927 | 10/1947 | Briggs | 210/532.1 |
| 2,541,491 | 2/1951 | Zani | 210/532.1 |
| 3,565,252 | 2/1971 | Sheehy et al. | 210/104 |
| 3,913,513 | 10/1975 | Pedone | 210/258 |
| 3,925,204 | 12/1975 | Cheysson et al. | 210/257.1 |
| 3,966,603 | 6/1976 | Grant | 210/138 |
| 4,031,839 | 6/1977 | Pedone | 210/924 |
| 4,147,629 | 4/1979 | Geurtsen | 210/104 |
| 4,171,932 | 10/1979 | Miller | 417/36 |
| 4,205,237 | 5/1980 | Miller | 307/118 |
| 4,371,790 | 2/1983 | Manning et al. | 307/118 |
| 4,404,093 | 9/1983 | Moyer | 210/138 |
| 4,422,931 | 12/1983 | Wolde-Michael | 210/540 |
| 4,746,423 | 5/1988 | Moyer | 210/104 |
| 4,802,978 | 2/1989 | Schmit et al. | 210/104 |
| 4,881,873 | 11/1989 | Smith et al. | 417/36 |
| 4,915,823 | 4/1990 | Hall | 210/95 |
| 4,960,513 | 10/1990 | Young | 210/104 |

*Primary Examiner*—Joseph W. Drodge
*Attorney, Agent, or Firm*—Dority & Manning

[57] ABSTRACT

An oil and water separator for separating oil from water collected in a bilge of a boat prior to discharging the water overboard. A reservoir is provided for receiving the mixture of oil and water from the bilge. The oil separates from the water and floats on top of the water. When only water is positioned between a pair of spaced electrical probes carried in the reservoir, such causes a drain valve to be opened to drain the water from the reservoir. As the water is drained from the reservoir, the oil floating on top of the water will come between the probes and close the valve, stopping the draining of water from the bottom of the reservoir. A mixture of oil and water is pumped from a tank carried in the bilge at an intermittent rate so that the mixture is allowed sufficient time to separate in the reservoir.

10 Claims, 3 Drawing Sheets

OIL AND WATER SEPARATOR FOR THE BILGE OF A BOAT

BACKGROUND OF THE INVENTION

This invention relates to an oil and water separator and more particularly, to an oil and water separator for use in boats for separating oil and water collected in the bilge of a boat prior to discharging the water overboard.

It is important to keep the bilges of a boat dry of both water and oil while at the same time preventing pollution of the water surrounding the boat with the fuel or waste water which has accumulated in the bilge. Lubricating oil leaking from the motor and fuel dripping from leaking lines frequently collect and mix with sea water which has accumulated because of leaking cutlass bearings and hull fittings. There are products on the market now which are designed to absorb the oil from the water prior to the water being pumped overboard but none are efficient enough to prevent rainbows from forming on the surface of the water as a result of small amounts of oil or fuel being discharged with the water that has been separated from the oil and water collected from the bilge. As a result all of the separated oil as well as any water containing small amounts of oil or fuel must be collected and discarded without contaminating the sea or lake.

Federal regulations prohibit a discharge of oil or other pollutants or hazardous substance into the waterways of the United States through the enactment of the Federal Water Pollution Control Act. Such regulations include the prohibition of pumping, pouring or discharging any kind of oil including fuel oil, gasoline, lubricating oil or oil/water mixtures normally collected in the bilge of marine vessels.

There have been many attempts to separate the oil from the water collected in the bilges of vessels and some prior art devices developed use filtering systems such as disclosed in U.S. Pat. Nos. 3,913,513 and 4,031,839. The inventions disclosed in these U. S. patents include the use of an oil filter for removing the oil pollutants from an oil/water mixture collected in the bilge of a boat wherein the filter has layers of different size expanded resin particles that are hydrophobic and olephilic. However, certain disadvantages are acknowledged to be associated with this type of filtering system which generally relate to the creation of back pressure caused by the filter to resist flow and hinder start-up of the bilge pump. Prior art systems of this type utilizing a filter also include inherent limitations in that a filter element commonly only absorbs approximately 50%-60% of the absorbent potential of the filter structure. Accordingly, the replacement or cleaning of the filter is a constant problem.

In an attempt to overcome the use of filters, oil separators such as shown in U.S. Pat. No. 4,915,823 have been developed. In this particular type of oil separator, the oil and water mixture collected in the bilge of a marine craft is fed into containers wherein the oil and water are allowed to separate mechanically and the water is then drained off the bottom of the receptacle. One problem with such devices is that they are too large for small recreational boats.

Other patents have been located during a search of the records of the United States Patent Office which disclose oil and water separators. Such are U.S. Pat. Nos. 1,494,906, 4,802,978, 4,422,931, 2,428,927, 4,147,629, 2,541,491 and 4,960,513.

SUMMARY OF THE INVENTION

This invention relates generally to a separator for separating oil and water and more particular, to a separator for separating oil and water that has collected in the bilge of a boat.

The separator includes a vertically extending reservoir which has a bottom and intermediate portion. An inlet communicates with the intermediate portion of the reservoir. A mixture of oil and water that has collected in the bilge of the boat is selectively pumped to the inlet of the reservoir. The reservoir has an outlet which is connected to a drain pipe which communicates with the bottom portion of the reservoir. A pair of spaced probes are provided in the intermediate portion of the reservoir and are connected in an electrical circuit so that when there is water positioned between the spaced probes, the resistance is such to cause the electrical circuit to activate a solenoid valve carried in the drain pipe for allowing the water to be drained from the tank. As the water level in the reservoir drops, oil comes between the probes and the resistance changes, causing the electrical circuit to de-energize the solenoid valve carried in the drain pipe for closing the drain. The drain also has a mechanical filter provided therein for removing any oil that possibly remains in the water being drained from the reservoir to assure that no rainbow is produced on the water's surface.

The reservoir has a float actuated switch provided in the top thereof which upon being activated by the level of the fluid carried in the reservoir, de-energizes a pump carried in the bilge stopping any further pumping of the mixture from the bilge to the reservoir. The pump that is used for pumping the mixture of oil and water from the bilge is connected in an electrical circuit which has an electrical switch provided for intermittently turning the pump on and off. The bilge pump is a low volume pump and as a result of being intermittently turned on and off, the mixture being deposited within the reservoir is allowed to separate in a more defined manner.

The mixture that is being fed through the inlet into the reservoir is deposited on top of a dispersion plate which disperses the mixture to its outside which reduces agitation and aids in allowing the oil to separate from the water within the reservoir.

Another feature of the oil and water separator constructed in accordance with the present invention is that a open top holding tank communicates with the drain conduit for receiving water being removed from the reservoir. The walls of the holding tank extend vertically above the bilge where the mixture of oil and water is collected so that in the event of an emergency, if there is a build-up of water at a rate faster than the small bilge pump can deliver the mixture of oil and water to the reservoir, a pump associated with the holding tank will pump overboard the water collected in the bottom of the boat.

The electrical circuit for controlling the operation of the solenoid valve associated with the drain conduit includes a power supply, and a voltage comparator which has two inputs. One input of the voltage comparator is connected to a variable wiper arm of a rheostat that is in turn connected to a power supply. The other input of the voltage comparator is connected to one of the probes. The other probe is connected directly to the ground. As a result, when water is positioned between the two probes, the voltage comparator generates a signal on its output which is fed to the base of a transistor. The transistor is triggered on and causes the solenoid operated valve carried in the drain conduit to be energized to open the conduit to allow the water to be drained from the reservoir. The circuit can be adjusted with the rheostat to operate with fresh or salt water.

Accordingly, it is an important object of the invention to provide a reliable and dependable apparatus for separating oil from water collected in the bilge of a boat.

Still another important object of the present invention is to provide an oil and water separator that has safety features provided therein for insuring that the oil is properly separated from the water before the water is discharged overboard.

Still another important object of the present invention is to provide a simple efficient and economical apparatus of small size that can be readily mounted in a boat for separating oil from water that has collected in the bilge of a recreational boat.

These and other aspects and advantages which characterize the present invention are pointed out with particularity in the claims attached hereto and forming a part hereof. However, for better understanding of the invention, its advantages, and objects attained by its use, reference should be had to the drawings which form a further part hereof, and the accompanying descriptive disclosure, in which there is illustrated and described a preferred embodiment of the invention.

DESCRIPTION OF THE PREFERRED EMBODIMENT

Figure 1:
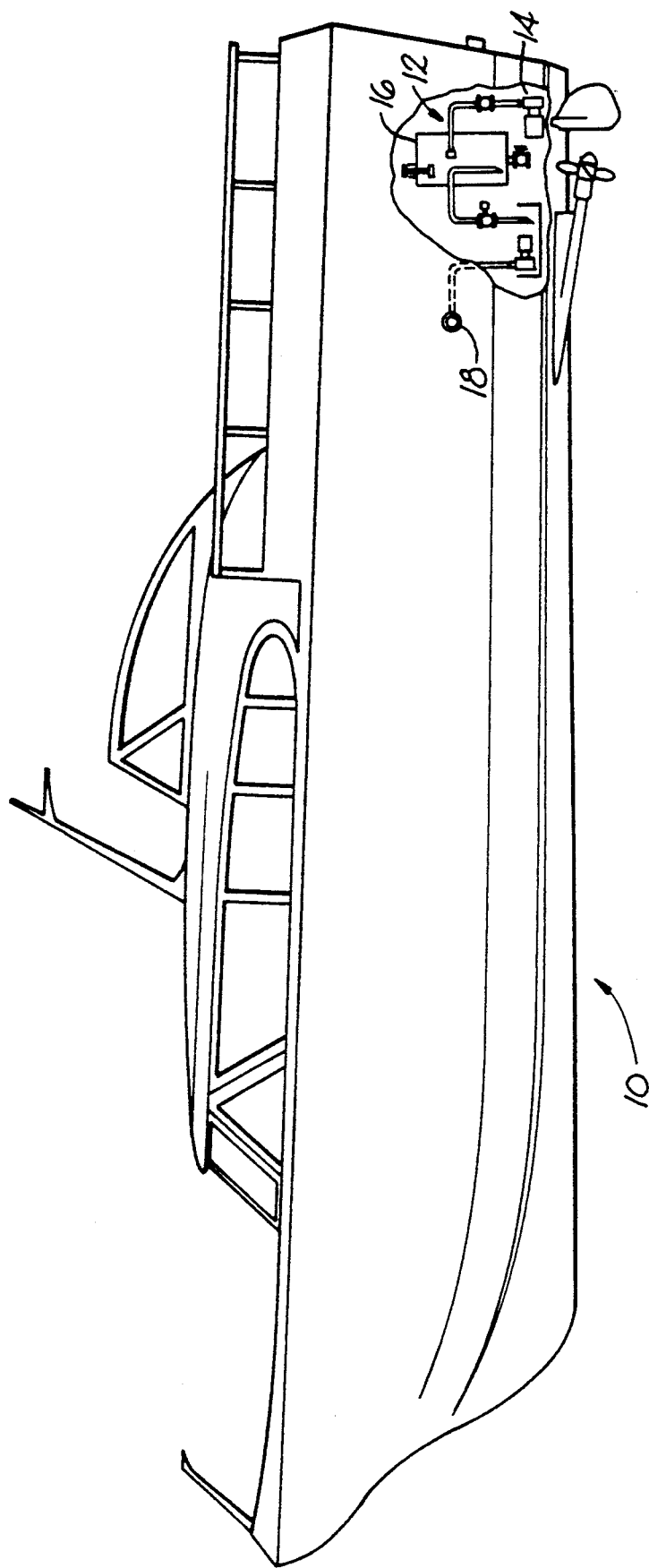
FIG. 1 is a side elevational view of a boat with parts broken away to show an oil and water separator mounted therein.

Referring in more detail to FIG. 1, there is illustrated a boat 10 generally referred to as a pleasure craft. While the oil and water separator constructed in accordance with the present invention is primarily designed for use on small boats rather than large ships, it is to be understood that its application is not to be limited to merely pleasure boats. The oil and water separator generally designated by the reference character 12 is carried within the bilge portion 14 of the boat and pumps a mixture of oil and water to a reservoir 16 for being separated so that only oil free water is pumped out through the side port 18 of the boat.

Figure 2:
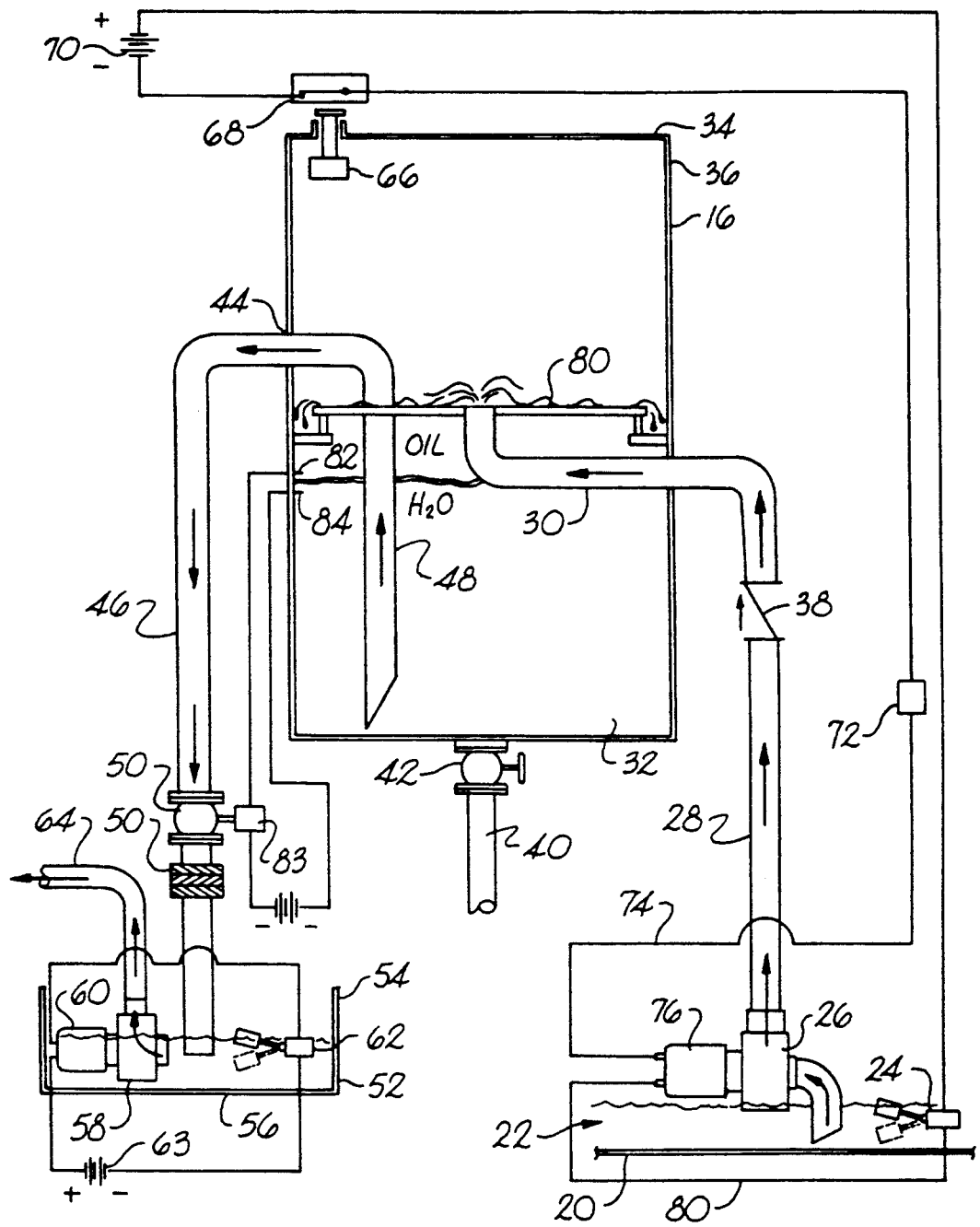
FIG. 2 is an enlarged schematic illustration of an oil and water separator constructed in accordance with the present invention.

Referring in more detail to FIG. 2, reference character 20 represents the bilge of a boat which collects a mixture 22 of oil and water. When the mixture 22 reaches a predetermined level within the bilge 20, a float actuated switch 24 is activated to turn on an electrically operated bilge pump 26. The output of the bilge pump is fed through a conduit 28 to an inlet 30 provided within the reservoir 16. The inlet 30 is located at an intermediate portion of the reservoir 16. The reservoir is constructed in the form of a vertically extending tank. It has a bottom portion 32 and a top 34 with surrounding walls 36. Interposed in the conduit 28 leading to the inlet 30 is a check valve 38 which permits the flow of oil and water mixture in one direction towards the reservoir.

The reservoir has an oil drainpipe 40 connected to the bottom thereof. The oil drain pipe 40 can be opened by manipulating a mechanical valve 42 for draining all of the residue from the tank.

After the oil and water separator has been operated for a predetermined period of time, oil accumulates within the reservoir to such a level that it is necessary to drain all of the fluid from the tank. This can be done by manipulating the valve 42. The oil and water that is drained through the oil drain pipe 40 can be placed in another tank carried within the boat or removed to another location.

The reservoir 16 has an outlet 44 that extends out to a drain conduit 46. Another conduit 48 communicates with the outlet 44 and extends to the bottom of the reservoir such as shown in FIG. 2. As a result, when the reservoir is being drained through outlet port 44, the fluid is taken from the bottom of the reservoir. The reservoir can be drained by opening a solenoid operated valve 50 interposed in the drain conduit 46. This permits fluid to be taken from the bottom of the reservoir and fed to an opened top holding tray 52. Prior to the water being deposited in the holding tray 52, it passes through a mechanical filter 54 for removing any molecules of oil that may possibly be retained in the water so that no rainbow forms on the water when the water is discharged from the boat. The holding tray 52 has vertically extending side walls 54 and a bottom 56. A pump 58 is carried within the holding tray and is driven by an electric motor 60. The pump is electrically operated by means of a float operated switch 62 which is connected in an electrical circuit including a power supply 63. When the water level within the tray 52 rises above a predetermined level, the float switch will energize the motor 60 to cause the water contained in the tray to be pumped out of discharge conduit 64.

As can be seen in FIG. 2, the side walls of the holding tray 52 extend vertically above the bilge of the boat. The purpose of this will be discussed more fully below.

Referring back to the reservoir 16, there is provided a float operated switch mechanism 66 adjacent the top of the reservoir which is pushed up when the fluid in the reservoir reaches close to the top of the reservoir. When the switch 66 is pushed up, it opens a normally closed reed switch 68.

One side of a normally closed switch 68 is connected to battery 70. The other side of switch 68 is connected to an intermittently operated switch 72. Intermittently operated switch 72 is connected to one terminal of the electric motor 76 by lead 74. The electric motor 76 is used for operating the bilge pump 26. The other terminal of electric motor 76 is connected by lead 80 to the float operated switch 24. The other side of float operated switch 24 is in turn connected back to the positive side of the battery 70. The electric switch 72 is an intermittent switch which, when energized intermittently, opens and closes the circuit.

The electrical circuit described so far is provided for filling the reservoir with the oil/water mixture collected in the bilge of the boat. The pump 26 is a relatively small pump and one suitable pump pumps at a rate of 360 gallons per hour. It is desirable to use a small pump because there is less agitation when pumping the mixture and it takes up very little space in the bilge. By intermittently operating the pump 26 as a result of the intermittent switch 72 alternately turning on and off the motor 76, a mixture of oil and water is pumped at a relatively slow rate into the reservoir. This gives adequate time for the oil and water to mechanically separate in the reservoir. In order to aid in separating the oil and water, the incoming mixture is dispersed on top of a plate 80.

In the preferred embodiment sensing means in the form of a pair of spaced probes 82 and 84 are carried adjacent the side wall of the reservoir in an intermediate vertical portion of the reservoir. These probes 82 and 84 are used for generating a signal for opening and closing the solenoid operated valve 50 provided in the drain conduit for draining water from the bottom of the reservoir.

Figure 3:
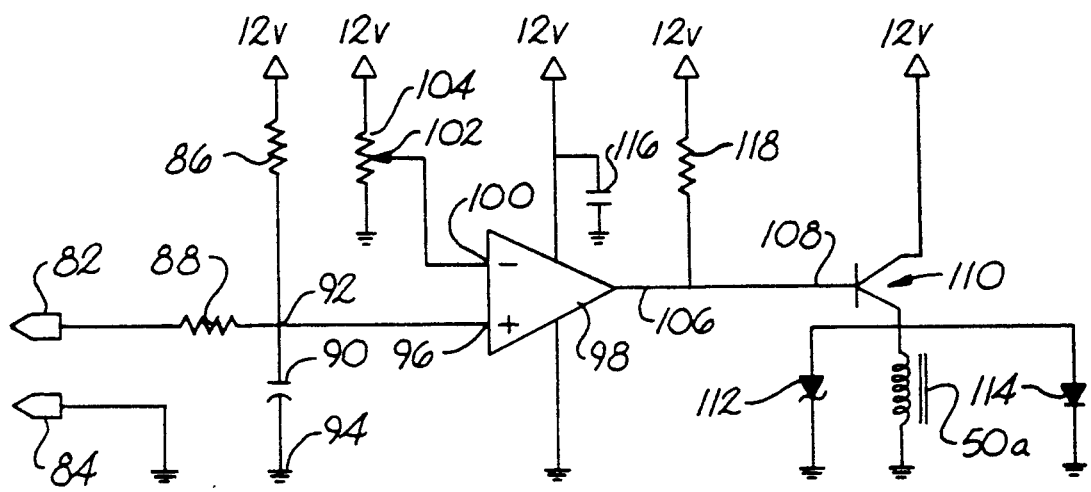
FIG. 3 is a schematic diagram illustrating a portion of the electrical control circuit for the oil and water separator.

The electrical circuit associated with the probes and the solenoid operated valve is shown in FIG. 3 and is generally identified by reference character 83.

A 12 volt power supply is connected to the various points indicated in FIG. 3. One point of the 12 volt power supply is connected through an impedance matching circuit which includes resistor 86, resistor 88 and capacitor 90. The capacitor 90 is connected between a junction 92 and ground 94. The resistor 86 is interposed between the battery and junction 92 while resistor 88 is interposed in a lead between probe 82 and junction 92. Junction 92 is connected to a positive input 96 of a voltage comparator 98. The other input 100 of voltage comparator 98 is connected to a wiper arm 102 of a potentiometer 104. The other side of potentiometer 104 is connected to the power supply. The potentiometer can be adjusted by moving the wiper arm for operating in different environments such as where the boat is operating in fresh water and where the boat is operated in salt water.

When the resistance between probes 82 and 84 drops as a result of substantially only water being interposed between the probes 84 and 82 as compared to oil, such causes the voltage comparator 98 to produce a signal on its output 106. The output 106 is connected to base electrode 108 of an NPN transistor 110, which is a semiconductor switching device. One electrode of the NPN transistor 110 is connected to the power supply and the other side is connected to a solenoid 50a which is used for operating the solenoid valve 50 provided in the drain conduit shown in FIG. 2. A Ziner diode 112 is connected to the transistor for setting the voltage level of the transistor. A LED light 114 is also connected to the output of the transistor 110 and such is illuminated when the solenoid 50a is energized. The LED light or any other suitable light can be mounted at the control panel in the boat to show the operator of the boat that the solenoid is either being energized or de-energized. A coupling capacitor 116 is connected between the 12 volt source and the comparator 98. A resistor 118 is connected between the 12 volt power supply and the output of comparator 98.

In summarizing the operation, as a result of the bilge pump being a low flow rate pump in the vicinity of 360 gallons per hour, the mixture of oil and water collected in the bilge 20 is pumped at a slow rate into the reservoir 16. It is only pumped to the reservoir when the float switch 24 is activated by the level of the mixture rising above a predetermined level. When the pump 26 is energized, it is selectively turned on and off in one embodiment for 20 second intervals so that the oil and water mixture will be pumped at a slow rate into the reservoir to allow the oil and water to physically separate. As the oil and water level builds up inside the reservoir, the oil that floats on top of the water rises above the top probe 82. When the space between the probes 82 and 84 is occupied by substantially only water, such causes the voltage comparator 98 to trigger the transistor to energize solenoid valve 50a. When solenoid 50a is energized, the valve 50 interposed in the drain conduit 46 opens allowing the water in the bottom of the reservoir to drain into the holding tray 52. The water remains in the holding tray 52 until it builds up to a level to activate the float operated switch 62 which turns on the main pump 58 which pumps the water out of the pipe 64.

If, for some reason, a major leak develops in the boat which overtaxes the bilge pump 26, the water level in the bottom of the boat will rise above the side walls 54 of the holding tank and flow into the holding tray. This turns on the large bilge pump 58 which pumps all of the water collected from the boat to prevent such from sinking. In one particular embodiment, the bilge pump 58 may have a capacity to pump 2,000 gallons per hour.

It will therefore be understood by those skilled in the art that the particular embodiment invention here presented is by way of illustration only, and is meant to be in no way restrictive; therefore, numerous changes and modifications may be made, and the full use of the equivalents resorted to, without departing from the spirit or scope of the invention as outlined in the appended claims.

What is claimed is:

1. An oil and water separator arranged for separating oil from water collected in a bilge of a boat prior to discharging the collected water overboard comprising:
   a vertically extending reservoir having a top, bottom and intermediate portion;
   an inlet communicating with said intermediate portion of said reservoir;
   an outlet communicating with said bottom portion of said reservoir;
   a first pump for supplying a mixture of oil and water from said bilge of said boat to said inlet of said reservoir;
   switch means connected to said pump for turning said pump on when the level of said mixture in said bilge exceeds a predetermined level to pump said mixture from said bilge to said reservoir;
   a pair of spaced electrical probes provided in said reservoir adjacent said intermediate portion of said reservoir;
   a drain conduit connected to said outlet for draining water from said reservoir;
   electrically operated valve means interposed in said drain conduit for selectively opening and closing said drain conduit;
   a source of electrical power;
   an electrical circuit means connecting said source of electrical power, said pair of electrical probes and said valve means for selectively opening said electrically operated valve means to drain water from the bottom portion of said reservoir while substantially only water bridges the space between said spaced probes and for otherwise closing said electrically operating valve so that the oil which floats on top of said water while in said reservoir remains in said reservoir while the separated water is removed from said reservoir;

a holding tray carried in a bottom portion of said boat and arranged for receiving water from said reservoir;

said holding tray having side walls extending upwardly a predetermined distance;

a pump carried in said holding tray; and switch means for energizing said pump carried in said holding tray when said water level in said holding tray exceeds a predetermined level as a result of build-up of water from said reservoir and also when water build-up in said bilge rises above the top of the walls of said holding tray.

2. The oil and water separator as set forth in claim 1 further comprising:

an electrical timing means connected to said source of electrical power and said switch means for alternately turning said first pump on and off for predetermined periods of time when said level in said bilge exceeds said predetermined level.

3. The oil and water separator as set forth in claim 1 further comprising:

a filter means interposed in said drain conduit for removing any oil from the water being drained from said reservoir.

4. The oil and water separator as set forth in claim 1 further comprising:

a conduit connected to said inlet of said reservoir and extending upwardly within said reservoir;

a radial extending plate carried adjacent a top end of said conduit upon which said mixture of oil and water entering said inlet is deposited.

5. An oil and water separator as set forth in claim 1 further comprising:

an oil drain pipe carried adjacent the bottom of said reservoir;

a valve interposed in said oil drain pipe for being selectively opened for draining both the oil and water from said reservoir.

6. The oil and water separator as set forth in claim 1 further comprising:

switch means carried adjacent the top of said reservoir for being activated when the level in said reservoir reaches adjacent the top of said reservoir for preventing any additional mixture to enter said reservoir.

7. An oil and water separator arranged for separating oil from water collected in a bilge of a boat prior to discharging the collected water overboard comprising:

a vertically extending reservoir having a top, bottom and intermediate portion;

an inlet communicating with said intermediate portion of said reservoir;

an outlet communicating with a bottom portion of said reservoir;

means for supplying a mixture of oil and water from said bilge of said boat to said inlet of said reservoir;

a pair of spaced electrical probes provided in said reservoir adjacent said intermediate portion of said reservoir;

a drain conduit connected to said outlet for draining water from said reservoir;

electrically operated valve means interposed in said drain conduit for selectively opening and closing said drain conduit;

a source of electrical power;

an electrical circuit means connecting said source of electrical power, said pair of electrical probes and said valve means for selectively opening said electrically operated valve means to drain water from the bottom portion of said reservoir while substantially only water bridges the space between said spaced probes and for otherwise closing said electrically operated valve so that the oil which floats on top of said water while in said reservoir remains in said reservoir while the separated water is removed from said reservoir; the electrical circuit means having a voltage comparator having a pair of input terminals and an output terminal, one of said probes being connected to one of said input terminals and the other input terminal being connected to said power source so that an output voltage is produced by said comparator when said probes are separated by water, and a semiconductor switching device connected to said output of said voltage comparator for energizing said electrically operated valve means when said probes are separated by water to drain water from said reservoir.

8. The oil and water separator as set forth in claim 7 wherein said electrical circuit further comprises:

an optical indicator means that is energized when said electrically operated valve means is energized.

9. The oil and water separator as set forth in claim 7 wherein said means for supplying said mixture collected in said bilge includes an intermittently operated pump means which pumps said mixture into said reservoir at a low volume.

10. An oil and water separator arranged for separating oil from a mixture of oil and water collected in a bilge of a boat comprising:

a vertically extending reservoir;

an inlet and outlet provided in said reservoir;

means for supplying said mixture collected in said bilge to said reservoir for allowing said oil to separate from said water by floating on top of said water;

sensing means carried in said reservoir for sensing the presence of only water at a predetermined level within said reservoir;

electrically operated valve means for opening and closing said outlet responsive to being energized;

a power supply;

an electrical circuit means connected to said power supply said sensing means and said electrically operated valve means for opening said valve when said water level in said reservoir rises above said predetermined level for energizing said electrically operated valve means allowing said water to drain out said reservoir through said outlet;

a holding tray carried in a bottom portion of said boat and arranged for receiving water from said reservoir; and a high volume pump carried in said holding tray for pumping water from said holding tray at a high rate when water level in said tray exceeds a predetermined level.

* * * * *